Jan. 12, 1954
H. N. LOCHEAD
2,665,571
EGG HOLDER
Filed Aug. 3, 1950
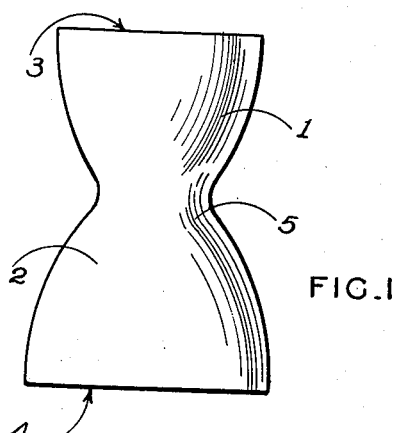
FIG.1
FIG.2.
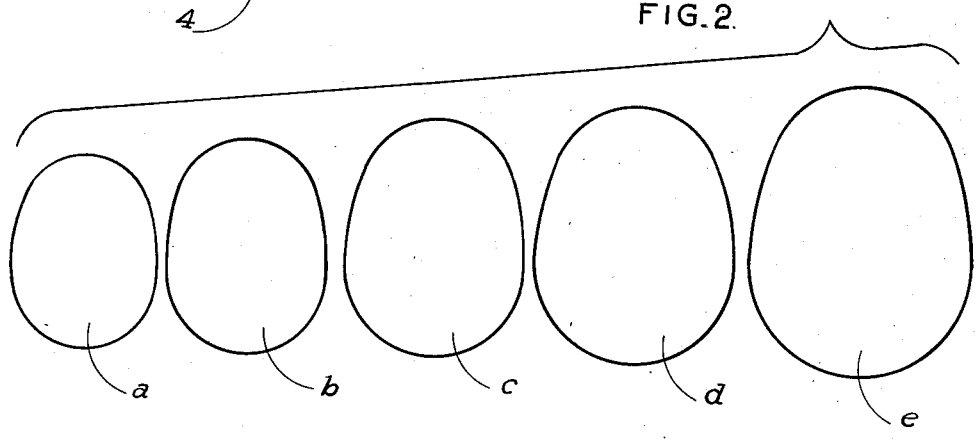
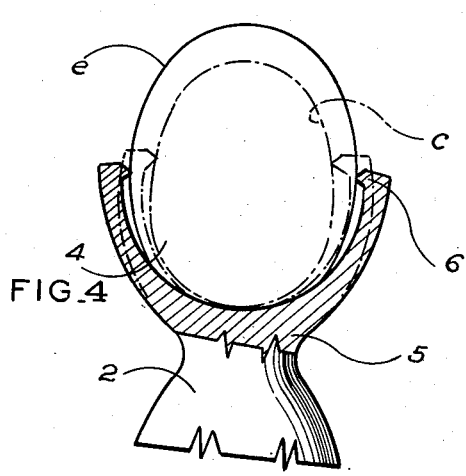
FIG.3
FIG.4
Inventor
HAROLD NELSON LOCHEAD
by
Attorney Patented Jan. 12, 1954

2,665,571

UNITED STATES PATENT OFFICE 2,665,571

EGG HOLDER

Harold Nelson Lochead, Ottawa, Ontario, Canada

Application August 3, 1950, Serial No. 177,382

1 Claim. (Cl. 65—22)

This invention relates to improvements in an egg holder and appertains particularly to one constructed of stretchable material.

The principal object of the invention is to provide an egg holder with a stretchable egg-receiving cup in each end and wherein the cups are of different sizes and so proportioned that all commercial standard sizes of eggs can be securely held in one end or the other.

A further object of the invention is to provide an egg holder capable of securely holding any standard size egg, that will afford stable support when rested on either end, and prove suitable for handling hot eggs or for holding an egg to be eaten directly from the shell or for emptying the contents of the egg into another receptacle.

A further object of the invention is to provide a stretchable, double-ended holder that will securely retain all standard sizes of eggs, and that is composed of relatively unbreakable and heat-insulating material, characterized by structural simplicity, and capable of manufacture at reasonable cost.

To the accomplishment of these and related objects as shall become apparent as the description proceeds, the invention resides in the construction, combination and arrangement of parts as shall be hereinafter more fully described, illustrated in the accompanying drawings, and pointed out in the claim hereunto appended.

The invention will be best understood and can be more clearly described when reference is had to the drawings forming a part of this disclosure wherein like characters indicate like parts throughout the several views.

In the drawings:

Figure 1 is an elevation of one preferred embodiment of the invention;

Figure 2 is a diagram of the various standard sizes of commercially graded eggs, ranging from "pullet" to "extra large";

Figure 3 is a vertical section of the holder shown in Figure 1; and

Figure 4 is a vertical sectional detail of the larger end of the same holder in stretched position to accommodate the largest standard size of egg, its normal unstretched size being shown dotted.

The instant form of egg holder shown in Figures 1, 3 and 4 is seen to consist of a moulded body 1 of a relatively heat-insulating rubber-like material with the desired degree of stretchability and having a smooth, easy-to-wash outer surface 2. Of generally elongated circular form it has deep, egg-receiving pockets 3 and 4 at opposite ends and a narrowed and solid waist 5 approximately midway of its height. The pockets 3 and 4 each have an interior marginal flange 6, preferably tapered to a thin or sharp inner edge 7, here shown as tapered on both upper and lower sides.

These egg-receiving pockets differ in size, the smaller pocket 3 being stretchable, however, to at least the normal, unstretched diameter of the larger pocket 4. Specifically the pockets are of such sizes as to be able to receive and securely retain in one or the other any of the standard commercial sizes of eggs shown in diagrammatic Figure 2 and ranging from "pullet" size $a$, on the left, through "small" $b$, "medium" $c$, "large" $d$, and "extra large" $e$, at the right. In relation to these standard commercially graded sizes of eggs, the smaller pocket 3 in normal unstretched condition is of a spherical form and size to receive deeply and hold securely a "pullet" size egg with substantially more than the lower larger half of the egg therein, as seen in Figure 3. This same smaller pocket is stretchable up to at least the normal unstretched diameter of the larger pocket 4 and is capable of accommodating at least the lower larger half of a "medium" size egg. Similarly, the larger pocket 4 can receive and securely hold a "medium" size egg with substantially more than the lower larger half of the egg therein and is expandable to receive and securely retain an "extra large" egg therein with at least the lower larger half accommodated, as seen in Figure 4.

Additional to the especially soft resilient inner edge 7 by which the marginal flange 6 engages the egg, its tapered upper and lower sides facilitate respectively the inserting and removing of an egg, which is particularly helpful when the instant cup or pocket is being extended to near limit size.

From the foregoing description taken in connection with the accompanying drawings, it will be manifest that an egg holder is provided that will fulfil all the necessary requirements of such a device, but as many changes could be made in the above description and many apparently widely different embodiments of the invention may be constructed within the scope of the appended claim, without departing from the spirit or scope thereof, it is intended that all matters contained in the said accompanying specification and drawings shall be interpreted as illustrative and not in a limitative or restrictive sense.

The embodiments of the invention in which an exclusive property or privilege is claimed are defined as follows:

As an article of manufacture, a double-ended egg holder capable of securely retaining any standard commercial size of egg comprising a body of generally elongated form, circular in cross-section and of varying diameter, being narrowed and solid at the waist and composed of heat-insulating stretchable rubber-like material with a smooth outer surface; a deep egg-receiving pocket in each end; and an unbroken and continuous interior marginal flange tapered on both upper and lower sides to a sharp and especially soft resilient inner edge in the mouth of each pocket whereby the inserting and removing of an egg is facilitated; one of said pockets being smaller than the other and stretchable to a size at least equal to the normal, unstretched size of the larger one, the normal unstretched size of said smaller pocket being substantially equal to more than the larger lower half of a standard "pullet" egg and the larger of said pockets being stretchable to the size of more than the lower larger half of a standard "extra large" egg, whereby the flanged edge of either pocket may firmly yet gently and securely grip an inserted egg at a point above the maximum diameter of the egg's larger end.

HAROLD NELSON LOCHEAD.

References Cited in the file of this patent

UNITED STATES PATENTS

| Number | Name | Date |
|---|---|---|
| 503,431 | Michel | Aug. 15, 1893 |
| 508,021 | Jewett | Nov. 7, 1893 |
| 710,073 | Pratt et al. | Sept. 30, 1902 |
| 1,156,459 | Brown | Oct. 12, 1915 |
| 1,449,358 | Weber | Mar. 20, 1923 |
| 1,491,908 | Greig | Apr. 29, 1924 |
| 1,618,682 | Snapp | Feb. 22, 1927 |
| 1,655,979 | Watkins | Jan. 10, 1928 |
| 1,759,398 | Hart | May 20, 1930 |
| 1,829,664 | McKay | Oct. 27, 1931 |
| 1,830,520 | Moyses | Nov. 3, 1931 |
| 2,531,955 | Toney | Nov. 28, 1950 |

FOREIGN PATENTS

| Number | Country | Date |
|---|---|---|
| 399,306 | France | June 26, 1909 |
| 406,415 | Great Britain | Mar. 1, 1934 |